United States Patent
Hartfiel et al.

(10) Patent No.: US 7,084,679 B2
(45) Date of Patent: Aug. 1, 2006

(54) METHOD AND APPARATUS FOR ENSURING SYNCHRONIZATION OF CLOCKS IN A MULTIPLE CLOCK SYSTEM

(75) Inventors: John Wayne Hartfiel, Austin, TX (US); Neil Ambalal Panchal, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 10/825,191

(22) Filed: Apr. 15, 2004

(65) Prior Publication Data

US 2005/0231244 A1    Oct. 20, 2005

(51) Int. Cl.
*H03L 7/00* (2006.01)

(52) U.S. Cl. .................................. 327/141; 327/142
(58) Field of Classification Search .................. None
See application file for complete search history.

(56) References Cited

U.S. PATENT DOCUMENTS

| | | | |
|---|---|---|---|
| 4,689,764 A | 8/1987 | Daniels | |
| 5,086,387 A | 2/1992 | Arroyo et al. | |
| 5,726,593 A * | 3/1998 | Ruuskanen | 327/99 |
| 6,175,603 B1 * | 1/2001 | Chapman et al. | 375/354 |
| 6,473,476 B1 | 10/2002 | Banks | |
| 6,900,674 B1 * | 5/2005 | Sutera et al. | 327/144 |

* cited by examiner

*Primary Examiner*—Timothy P. Callahan
*Assistant Examiner*—An T. Luu
(74) *Attorney, Agent, or Firm*—Carr LLP; Diana R. Gerhardt

(57) ABSTRACT

An apparatus, a method, and a computer program product are provided for producing a synchronous divider reset signal. A notorious concern with multiple non-integer frequency ratio synchronous source clocks has been the time of edge alignment between the respective clocks. To address this concern, a number of latches can be utilized in order to detect alignment of the edges of these clocks. Specifically, the latches are employed to assist in the production of a synchronous divider reset signal for downstream dividers that are utilized in many microprocessors today. Hence, all of the downstream dividers can be properly synchronized to alleviate any errors that can occur between respective macros of a microprocessor chip resulting from misalignment of clock edges.

28 Claims, 6 Drawing Sheets

METHOD AND APPARATUS FOR ENSURING SYNCHRONIZATION OF CLOCKS IN A MULTIPLE CLOCK SYSTEM

FIELD OF THE INVENTION

The present invention relates generally to clock synchronization, and more particularly, to the synchronization of multiple clocks in a multi-clock system.

DESCRIPTION OF THE RELATED ART

In a number of systems, multiple clocks are a common feature. The multiple clocking signals may be generated by virtue of a single source clock or multiple source clocks. Typically, though, there are multiple source clocks. These source clocking signals can then be divided to provide the necessary clocking signals for a complete system to function. However, the many clocking signals that are generated should also be synchronized. In other words, all of the clocking signals, including the source clocking signals, have either a rising or falling edge in common. The following descriptions assume that all clocking signals have a rising edge in common. However, the same principles are applied for applications involving clocking signals that have a falling edge in common.

Within these systems that have multiple clocking signals, there are two situations that are of concern: integer frequency ratios between source clocking signals and non-integer frequency ratios between source clocking signals. FIG. 1A is an example of an integer frequency ratio between two source clocking signals, wherein the ratio of Clock 1 to Clock 2 is 2:1. FIG. 1B is an example of a non-integer frequency ratio between two source clocking signals, wherein the ratio of Clock 1 to Clock 2 is 3:4. The reason for concern with these two situations is synchronization of clocking signals generated by downstream dividers.

In order to synchronize the clocking signals generated by downstream dividers, there are certain design considerations. With an integer frequency ratio between source clocking signals, synchronization is trivial. Since the rising edge of the slowest clock would be aligned with the rising edge of the fastest clock, the time of the alignment is known. The assertion and deassertion of an asynchronous divider reset signal would be synchronized with the rising edge of the slowest clock. Therefore, alignment of the rising edges of the downstream clocking signals would be achieved.

However, a non-integer frequency ratio between source clocking signals is a more significant design concern. In fact, a concern is the time of the alignment between source clocking signals. The time of the alignment is unknown. Therefore, devices are required to make measurements and provide an indication as to when alignment occurs between source clocking signals. Conventional solutions, though, are typically not configured for multiple source clocks.

Therefore, there is a need for a method and/or apparatus for synchronizing clocking signals that addresses at least some of the problems associated with conventional methods and apparatuses for synchronizing clocking signals.

SUMMARY OF THE INVENTION

The present invention provides a method, an apparatus, and a computer program for generating a synchronous divider reset signal for a plurality of non-integer frequency ratio clocks. A syncClk clocking signal is produced from the non-integer frequency ratio source clock inputs. Once the syncClk clocking signal is generated, an asynchronous divider reset signal is captured by synchronization latches. Together, the asynchronous divider reset signal and the syncClk clocking signal are employed to produce a sync signal. The synchronization latches utilize an edge of the syncClk clocking signal to produce the sync signal. After the production of the sync signal, counting signals are generated from the sync signal, which are triggered on an edge of one of the non-integer frequency ratio clocks. Then at least one logic operation is performed on some of the counting signals to produce a synchronous divider reset signal.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

Figure 1A:
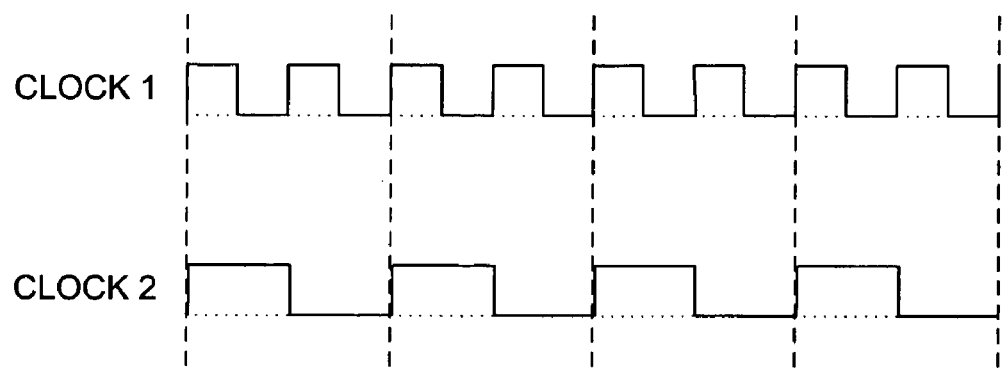
FIG. 1A is a timing diagram depicting two clocking signals with integer frequency ratios.
Figure 1B:
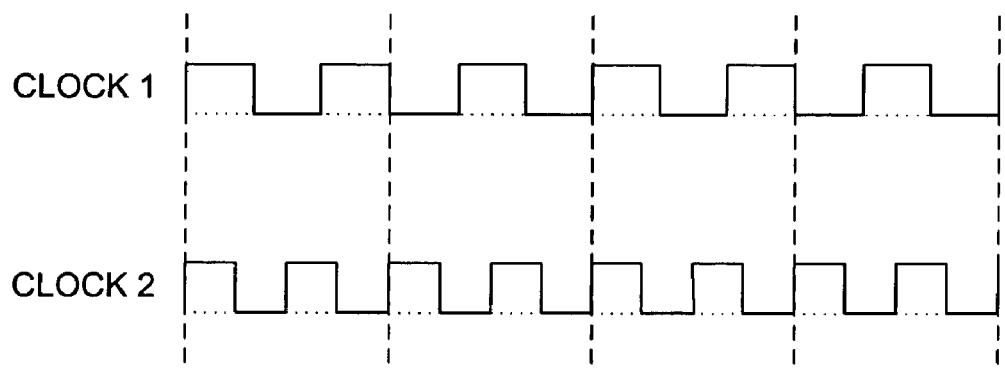
FIG. 1B is a timing diagram depicting two clocking signals with non-integer frequency ratios.
Figure 2:
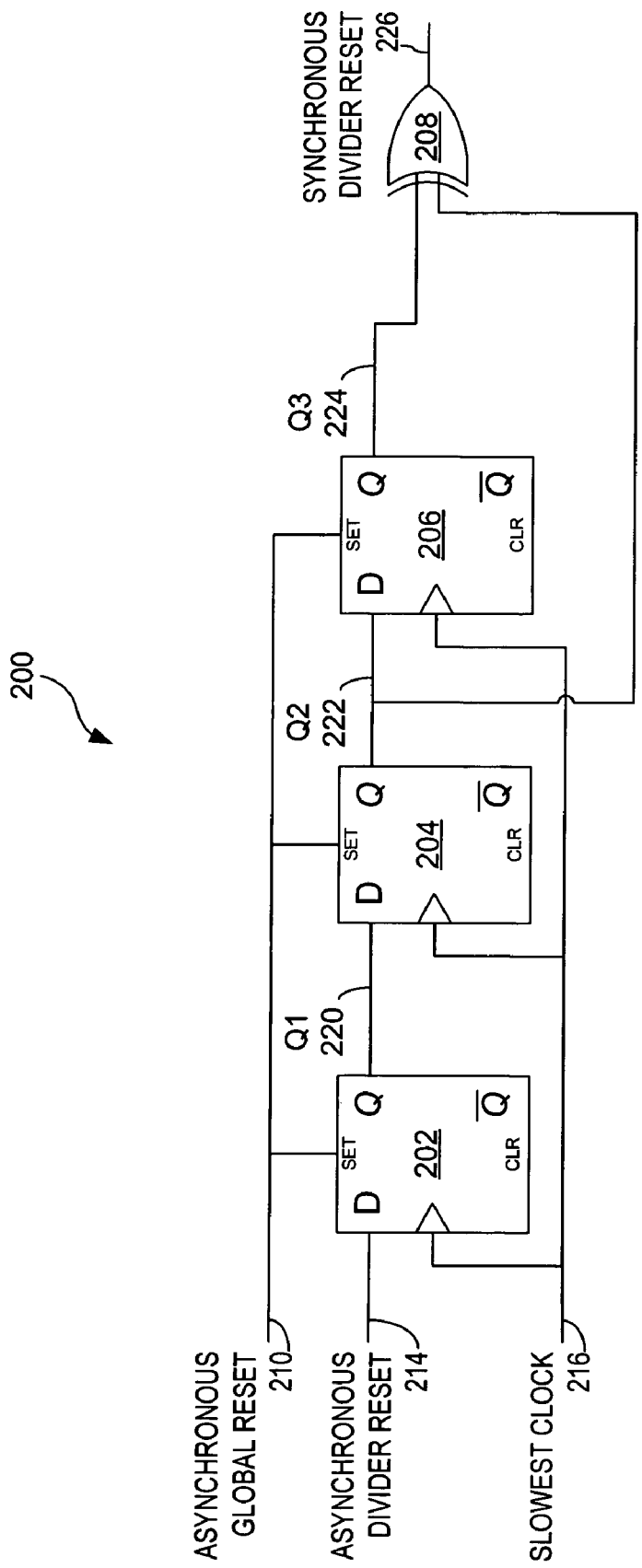
FIG. 2 is a block diagram depicting a synchronizing circuit for two clocking signals that have integer frequency ratios.

Referring to FIG. 2 of the drawings, the reference numeral 200 generally designates a block diagram depicting a synchronizing circuit for two clocking signals that have integer frequency ratios. The synchronizing circuit 200 comprises a first D flip-flop 202, a second D flip-flop 204, a third D flip-flop 206, and an XOR gate 208.

In order for the synchronizing circuit 200 to function, components have to be properly connected. The first D flip-flop 202 receives an asynchronous divider reset signal, a clocking signal from the slowest clock, and an asynchronous global reset signal through a first communication channel 214, a second communication channel 216, and a third communication channel 210, respectively. The second D flip-flop 204 receives the output of the first D flip-flop 202 or Q1, a clocking signal from the slowest clock, and an asynchronous global reset signal through a fourth communication channel 220, the second communication channel 216, and the third communication channel 210, respectively. The third D flip-flop 206 receives the output of the second D flip-flop 204 or Q2, a clocking signal from the slowest clock, and an asynchronous global reset signal through a fifth communication channel 222, the second communication channel 216, and the third communication channel 210, respectively. The XOR 208 receives an output from the third D flip-flop 206 or Q3 and Q2, through a sixth communication channel 224 and the fifth communication channel 222 to produce a synchronous divider reset signal through a seventh communication channel 226.

Figure 3:
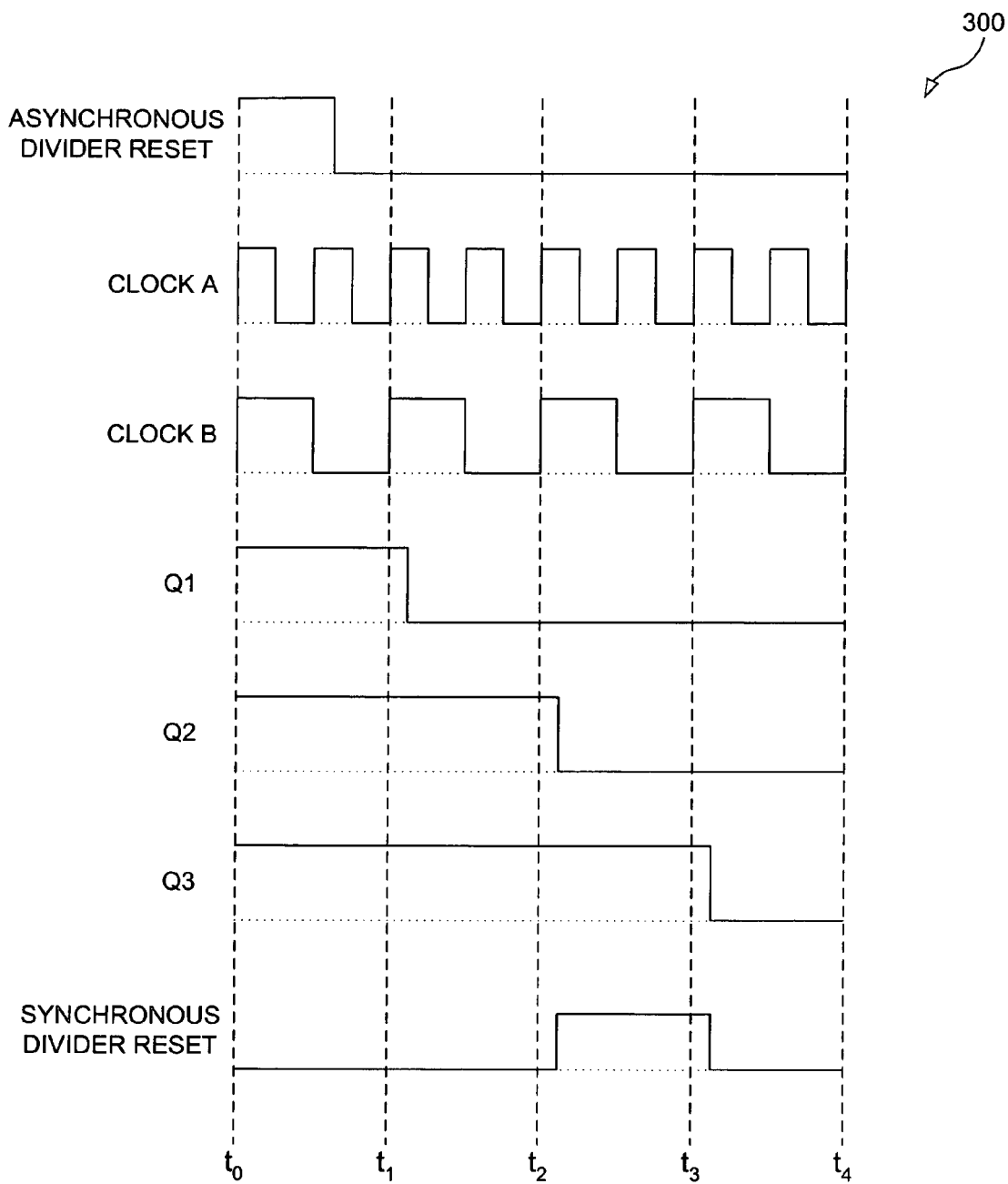
FIG. 3 is a timing diagram depicting the functionality of a synchronizing circuit for two clocking signals that have integer frequency ratios.

Referring to FIG. 3 of the drawings, the reference numeral 300 generally designates a timing diagram for the synchronizing circuit 200 for two clocking signals that have integer frequency ratios.

At certain stages, known states of each of the respective D flip-flops is required. During some situations, such as power up, the outputs of the D flip-flops, though, are unknown. Therefore, errant output signals may be present. Hence, the asynchronous global reset signal initializes the D flip-flops to a known state (logic high) to eliminate any errant outputs of the D flip-flops and, thus, the synchronizing circuit 200.

At initial power up, an assumption is made that the asynchronous divider reset signal is logic low (not shown) and that the asynchronous global reset signal (not shown) is responsible for generating the synchronous divider reset signal. Once power is applied, additional synchronous divider reset signal pulses (not shown) may be generated when desired by setting the asynchronous divider reset signal to a logic high for a time period long enough such that the asynchronous divider reset signal is successfully captured by the first D flip-flop 202 of FIG. 2. Timing diagram 300 indicates the initial state of the synchronizing circuit assuming the asynchronous divider reset signal has been logic high for a time period long enough such that the state of all D flip-flops is a logic high prior to time $t_0$.

The functionality of the synchronizing circuit 200 of FIG. 2 once powered up is not readily apparent without discussion of the timing diagram 300. There are two source clocking signals that the synchronizing circuit 200 functions with: Clock A and Clock B. From the timing diagram, the ratio of Clock A to Clock B is 2:1, where Clock B is the slower of the two. Hence, the synchronizing circuit 200 would then utilize Clock B as the input clock for the second communication channel 216 for each of the D flip-flops 202, 204, and 206.

At an initial time $t_0$, Q1, Q2, and Q3 are logic high. Sometime before a first time $t_1$, the asynchronous divider reset signal is set to a logic low. The asynchronous divider reset signal is input into the first D flip-flop 202 through the first communication channel 214 of FIG. 2. By normal functionality of the D flip-flop, the output Q1 of the first D flip-flop 202 will not toggle until there is a rising edge of an input clocking signal. In the timing diagram 300, the input clocking signal is Clock B, and the next rising edge, after the asynchronous divider reset signal has been set to logic low, is at the first time $t_1$.

Once the output Q1 of the first D flip-flop 202 has toggled to a logic low, the remainder of the logic levels in the sequential logic will toggle. The output Q2 of the second D flip-flop 204 will not toggle until there is a rising edge of an input clocking signal. The next rising edge, after Q1 has toggled, is at a second time $t_2$. Once Q2 toggles to logic low, then the XOR 208 will output a logic high signal as the synchronous divider reset signal because Q2 is logic low and Q3 is logic high. The XOR 208 will output a logic high signal until Q3 is logic low. The output Q3 of the third D flip-flop 206 will not toggle until there is a rising edge of an input clocking signal. The next rising edge, after Q2 has toggled, is at a third time $t_3$. Therefore, the output of the XOR 208 provides a properly timed synchronous divider reset signal for downstream dividers.

Figure 4:
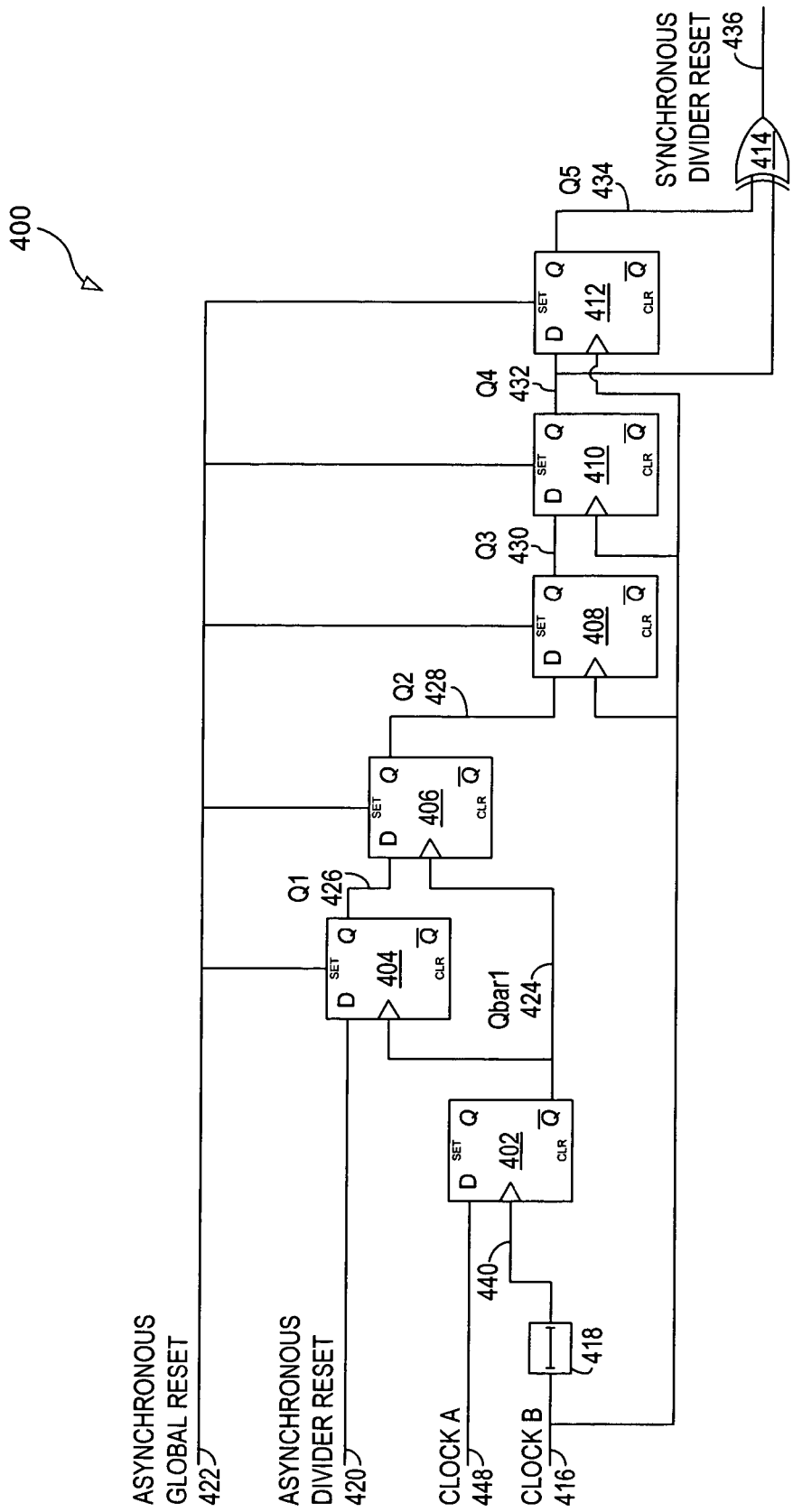
FIG. 4 is a block diagram depicting a synchronizing circuit for two clocking signals that have non-integer frequency ratios.

Referring to FIG. 4 of the drawings, the reference numeral 400 generally designates a block diagram depicting a synchronizing circuit for two source clocking signals that have non-integer frequency ratios. The synchronizing circuit 400 comprises a first D flip-flop 402, a second D flip-flop 404, a third D flip-flop 406, a fourth D flip-flop 408, a fifth D flip-flop 410, a sixth D flip-flop 412, an XOR 414, and a delay element 418.

The synchronizing circuit 400, however, can be divided into sub-components. The delay element 418 and the first D flip-flop 402 function together as the sampling circuit to generate the syncClk clocking signal, indicating a time when the two source clocking signals are misaligned. The second D flip-flop 404 and the third D flip-flop 406 function together as the synchronization latches which alleviate metastability problems when capturing the asynchronous divider reset signal. These latches are responsible for generating the sync signal. Finally, the fourth D flip-flop 408, the fifth D flip-flop 410, the sixth D flip-flop 412, and the XOR 414 operate as the divider reset counting circuit, which counts pulses from the time misalignment is detected to the time when alignment occurs. In this implementation, the divider reset counting circuit produces three counting signals, and ultimately, the synchronous divider reset signal.

In order for the synchronizing circuit 400 to function, components have to be properly connected. The Clock B signal is input into the delay element 418, into the fourth D flip-flop 408, into the fifth D flip-flop 410, and into the sixth D flip-flop 412 through a first communication channel 416. The first D flip-flop 402 receives a Clock A signal and a delayed Clock B signal through a second communication channel 448 and a third communication channel 440, respectively. The second D flip-flop 404 receives an inverted output of the first D flip-flop 402 or Qbar1, an asynchronous divider reset signal, and an asynchronous global reset signal through a fourth communication channel 424, a fifth communication channel 420, and a sixth communication channel 422, respectively. The third D flip-flop 406 receives Qbar1, an output of the second D flip-flop 404 or Q1, and an asynchronous global reset signal through the fourth communication channel 424, a seventh communication channel 426, and the sixth communication channel 422, respectively. The fourth D flip-flop 408 receives a Clock B signal, an output of the third D flip-flop 406 or Q2, and an asynchronous global reset signal through the first communication channel 416, an eighth communication channel 428, and the sixth communication channel 422, respectively. The fifth D flip-flop 410 receives a Clock B signal, an output of the fourth D flip-flop 408 or Q3, and an asynchronous global reset signal through the first communication channel 416, a ninth communication channel 430, and the sixth communication channel 422, respectively. The sixth D flip-flop 412 receives a Clock B signal, an output of the fifth D flip-flop 410 or Q4, and an asynchronous global reset signal through the first communication channel 416, a tenth communication channel 432, and the sixth communication channel 422, respectively. The XOR 414 then receives Q4 through the tenth communication channel 432 and an output of the sixth D flip-flop 412 or Q5 through an eleventh communication channel 434 to produce a synchronous divider reset signal through a twelfth communication channel 436.

Figure 5:
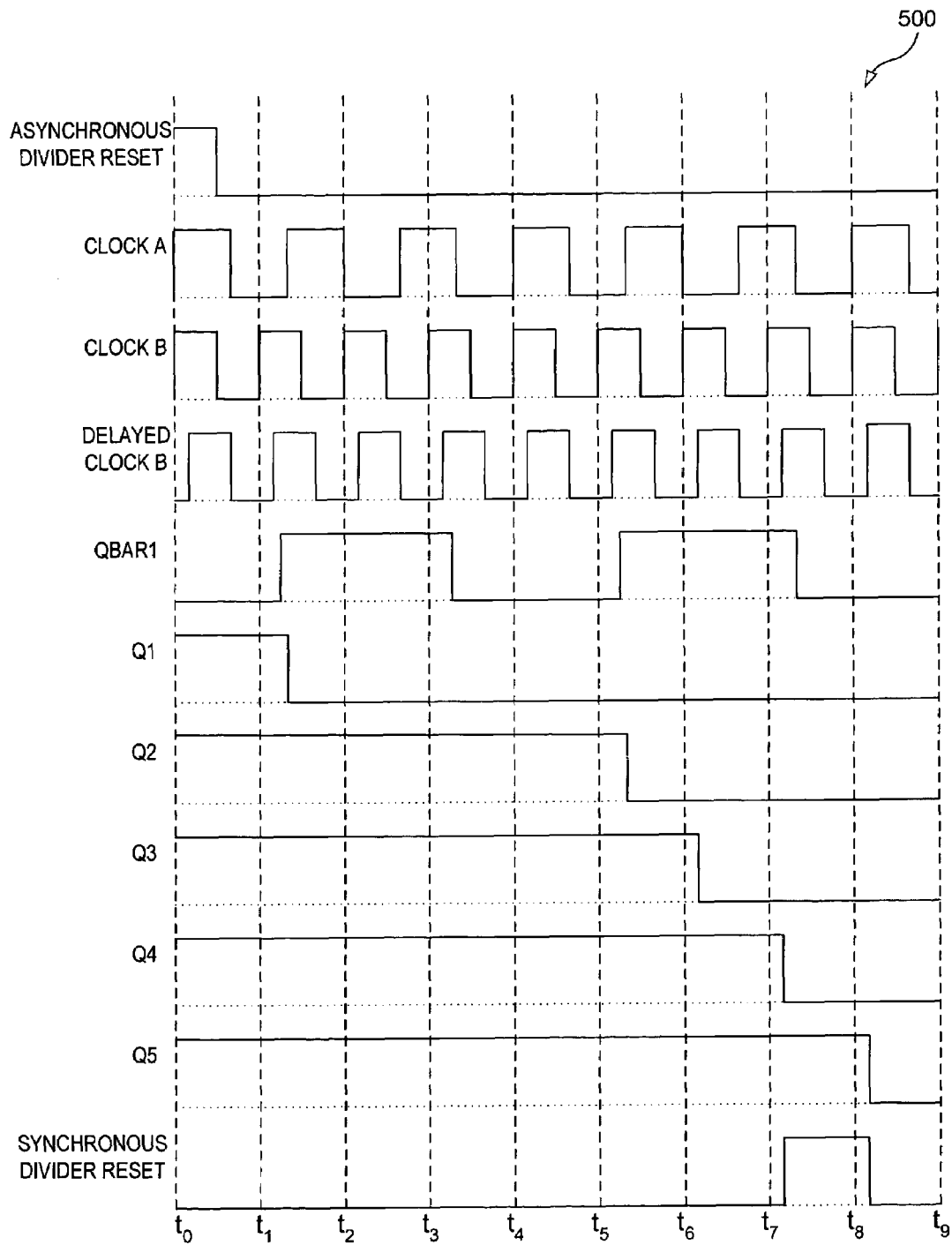
FIG. 5 is a timing diagram depicting the functionality of a synchronizing circuit for two clocking signals that have non-integer frequency ratios.

Referring to FIG. 5 of the drawings, the reference numeral 500 generally designates a timing diagram for the synchronizing circuit 400 for two source clocking signals that do not have integer frequency ratios.

At certain stages, known states of each of the respective D flip-flops is required. During some situations, such as power up, the outputs of the D flip-flops, though, are unknown. Therefore, errant output signals may be present. Hence, the asynchronous global reset signal initializes the D flip-flops to a known state (logic high) to eliminate any errant outputs of the D flip-flops and, thus, the synchronizing circuit 400.

At initial power up, an assumption is made that the asynchronous divider reset signal is logic low (not shown) and that the asynchronous global reset signal (not shown) is responsible for generating the synchronous divider reset signal. Once power is applied, additional synchronous divider reset signal pulses (not shown) may be generated when desired by setting the asynchronous divider reset signal to a logic high for a time period long enough such that the asynchronous divider reset signal is successfully captured by the second D flip-flop 404 of FIG. 4. Timing diagram 500 indicates the initial state of the synchronizing circuit assuming the asynchronous divider reset signal has been logic high for a time period long enough such that the state of all D flip-flops is a logic high prior to time $t_0$.

The functionality of the synchronizing circuit 400 of FIG. 4 once powered up is not readily apparent without discussion of the timing diagram 500. There are two source clocking signals that the synchronizing circuit 400 functions with: Clock A and Clock B. From the timing diagram, the ratio of Clock A to Clock B is 3:4, where Clock A is the slower of the two. Clock B is known as the sampling clocking signal, since it samples Clock A.

When implemented, a comparison should be made between the two source clocking signal frequencies to determine which source clocking signal should be used as the sampling clocking signal. The source clocking signal that provides the largest possible minimum timing window should be chosen. The minimum timing window, using Clock A's rising edge as a reference, is calculated by measuring the minimum positive difference between Clock A's rising edge and the next successive edge on Clock B. This value represents the tightest timing constraint that would have to be met if Clock A were to be used as the sampling clocking signal to sample Clock B. Similarly, the minimum timing window, using Clock B's rising edge as a reference, is calculated by measuring the minimum positive difference between Clock B's rising edge and the next successive edge on Clock A. This value represents the tightest timing constraint that would have to be met if Clock B were to be used as the sampling clocking signal to sample Clock A. Therefore, the largest possible minimum timing window is the larger of these two quantities. As a result, the source clocking signal whose reference edge produces the largest possible minimum timing window should be selected as the sampling clocking signal. The window, though, should be large enough to meet the setup/hold time requirements for the sampling flip-flop under all conditions, such as the maximum skew between the two source clocking signals. However, the sampling clocking signal should also be capable of generating a syncClk clocking signal, wherein the syncClk clocking signal is derived by taking the inverse of the sampled clocking signals logic value. The syncClk clocking signal should maintain the properties that it rises and falls once during the time period between rising edge alignment on Clock A and Clock B and that it has a constant frequency. Using Clock B as the sampling clocking signal satisfies the above requirements.

At an initial time $t_0$, Q1, Q2, Q3, Q4, and Q5 are logic high, while Qbar1 is logic low. The syncClk clocking signal, which is Qbar1, is generated by a composition of the Clock A and Clock B signals. The Clock A signal is input into the first D flip-flop through the second communication channel 448 of FIG. 4 to function as the "D" input. The delayed Clock B is input into the first D flip-flop through the third communication channel 440 to function as a clock. When Clock A falls to logic low, then Qbar1 toggles from logic low to logic high on a rising edge of the delayed Clock B signal sometime between the first time $t_1$ and the second time $t_2$.

Sometime before a first time $t_1$, the asynchronous divider reset signal is set to a logic low, and the Clock A signal falls to a logic low level. The asynchronous divider reset signal is input into the second D flip-flop 404 of FIG. 4 through the fifth communication channel 420. The output Q1 of the second D flip-flop 404 will not toggle, however, until there is a rising edge of an input clocking signal, which is Qbar1. Hence, Q1 becomes logic low between the first time $t_1$ and the second time $t_2$.

Once Q1 has toggled to logic low, the output of the third D flip-flop 406 of FIG. 4 or Q2, which is the sync signal, is enabled to toggle. By normal function of the D flip-flop, Q2 cannot toggle until there is another rising edge of Qbar1. The next rising edge for Qbar1 occurs between a fifth time $t_5$ and a sixth time $t_6$. Therefore, Q2 toggles from logic high to logic low between the fifth time $t_5$ and the sixth time $t_6$.

The output of the fourth D flip-flop 408 of FIG. 4 or Q3, which is one of three counting signals, is enabled to toggle after Q2 is at logic low. Q3 cannot toggle, however, until there is a rising edge of Clock B. The next rising edge for Clock B occurs at the sixth time $t_6$. Therefore, Q3 toggles from logic high to logic low after the sixth time $t_6$.

After Q3 toggles to logic low, the output of the fifth D flip-flop 410 of FIG. 4 or Q4, which is one of three counting signals, is enabled to toggle. Q4 cannot toggle, however, until there is a rising edge of Clock B. The next rising edge for Clock B occurs at the seventh time $t_7$. Therefore, Q4 toggles from logic high to logic low after the seventh time $t_7$.

Once Q4 is at logic low, the output of the sixth D flip-flop 412 of FIG. 4 or Q5, which is one of three counting signals, is enabled to toggle. Q5 cannot toggle, however, until there is a rising edge of Clock B. The next rising edge for Clock B occurs at the eighth time $t_8$. Therefore, Q5 toggles from logic high to logic low after the eighth time $t_8$.

Based on the timing of the toggling of the outputs of the respective D flip-flops, the XOR 414 of FIG. 4 will produce a properly timed synchronous divider reset signal. The XOR 414 receives Q4 and Q5 to produce a logic signal, which is the synchronous divider reset signal. When Q4 and Q5 are both logic high, the XOR 414 produces a logic low signal. However, after the seventh time $t_7$ when Q4 is logic low, the XOR 414 produces a logic high signal. The synchronous divider reset signal returns to logic low once Q5 is logic low after the eighth time $t_8$. Therefore, the output of the XOR 414 provides a properly timed synchronous divider reset signal for downstream dividers.

Hence, by utilizing the synchronizing circuit 400 of FIG. 4, determination of misalignment can be made. The synchronizing circuit 400 provides rising edge alignment between the non-integer frequency ratio clocks. Therefore, by the use of a relatively simple design, downstream dividers can be properly aligned. Incidentally, the synchronizing circuit 400 will also bring the divided clocking signals back into synchronization if they do drift out of sync by pulsing the asynchronous divider reset signal as described earlier.

The synchronizing circuit 400 of FIG. 4, though, does not function for all frequency ratios. For n−1:n ratios, as this ratio approaches one, the sampling circuit begins to fail. More generally, for n:m ratios with m held constant, as this ratio approaches one, the sampling circuit begins to fail. The limiting ratio of the sampling circuit is limited by the switching speeds of the various internal gates (not shown). In addition, depending on the ratio of Clock A to Clock B and the sampling clocking signal selected, the number of divider reset counting latches, and thus the number of counting signals, may need to be altered.

Figure 6:
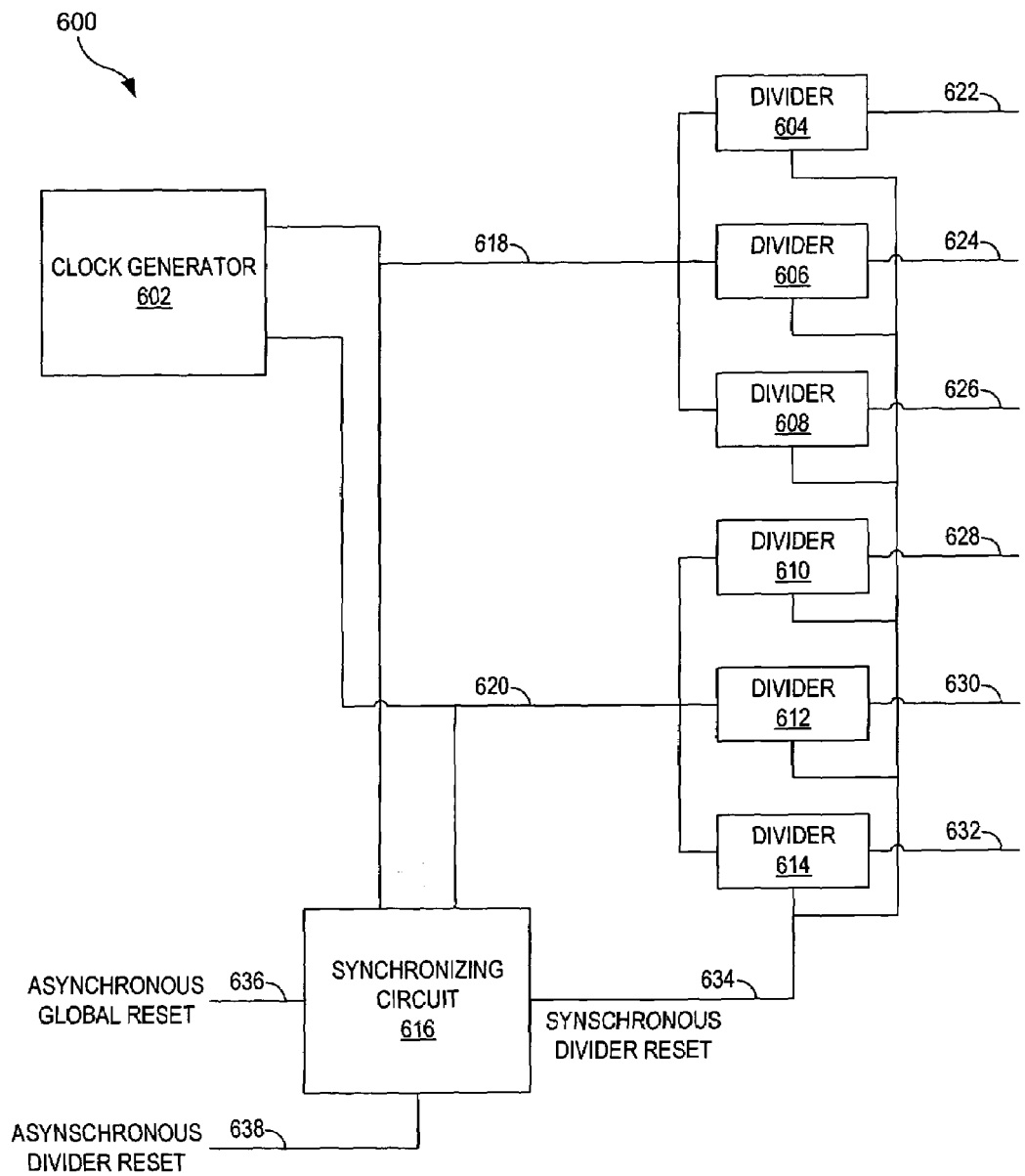
FIG. 6 is a block diagram depicting an example circuit that utilizes a synchronizing circuit for two clocking signals that have non-integer frequency ratios.

Referring to FIG. 6 of the drawings, the reference numeral 600 generally designates a block diagram depicting an example circuit that is utilizing the synchronizing circuit 400 of FIG. 4. The example circuit 600 comprises a clock generator 602, a first divider 604, a second divider 606, a third divider 608, a fourth divider 610, a fifth divider 612, a sixth divider 614, and the synchronizing circuit 616.

The example circuit 600 provides six clocking signals that are derived from two source clocking signals. The clock generator 602 produces two source clocking signals that have a non-integer frequency ratio. A first clocking signal is output from the clock generator 602 to the first divider 604, the second divider 606, and the third divider 608 through a first communication channel 618. A second clocking signal is output from the clock generator 602 to the fourth divider 610, the fifth divider 612, and the sixth divider 614 through a second communication channel 620.

Each of the dividers then outputs a divided clocking signal. The first divider 604 outputs a first divided clocking signal through a third communication channel 622. The second divider 606 outputs a second divided clocking signal through a fourth communication channel 624. The third divider 608 outputs a third divided clocking signal through a fifth communication channel 626. The fourth divider 610 outputs a fourth divided clocking signal through a sixth communication channel 628. The fifth divider 612 outputs a fifth divided clocking signal through a seventh communication channel 630. The sixth divider 614 outputs a sixth divided clocking signal through an eighth communication channel 632.

However, in order for the six divided clocking signals to be aligned, the six dividers are synchronized. The synchronizing circuit 616 receives the two source clocking signals through the first communication channel 618 and the second communication channel 620. Also, the synchronizing circuit 616 receives an asynchronous global reset signal and an asynchronous divider reset signal through a ninth communication channel 636 and a tenth communication channel 638, respectively. A synchronous divider reset signal can then be generated by the synchronizing circuit 616, which is output to each of the six dividers through an eleventh communication channel 634. Hence, each of the dividers can then produce an independent divided clocking signal that is properly aligned with the source clocking signals and the other divided clocking signals.

The preceding explanation involves the use of D flip-flops that are triggered on the rising edge of a given clocking signal. It is also possible to utilize falling edge triggered D flip-flops, and it is also possible to utilize other types of latches. However, additional modifications to the synchronizing circuit may be necessary. In addition, the asynchronous global reset signal is utilized to initialize the D flip-flops to a logic high state. It is also possible to utilize the asynchronous global reset signal to initialize all D flip-flops to a logic low state. However, additional modifications to the synchronizing circuit may be necessary. The underlying principles remain the same regardless of which implementation is selected.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for synchronizing an asynchronous divider reset signal for a plurality of non-integer frequency ratio clocking signals, comprising:
   a sampling circuit to at least derive a syncClk clocking signal from the plurality of non-integer frequency ratio clocking signals;
   a plurality of synchronization latches at least configured to toggle on an edge of the syncClk clocking signal, wherein at least one synchronization latch of the plurality of latches is at least configured to receive the asynchronous divider reset signal, and wherein at least one synchronization latch of the plurality of synchronization latches is at least configured to produce a sync signal; and
   a counting circuit at least configured to receive the sync signal and at least configured to output a synchronous divider reset signal.

2. The apparatus of claim 1, wherein the plurality of non-integer frequency ratio clocking signals further comprises two synchronous input clocking signals.

3. The apparatus of claim 1, wherein the sampling circuit further comprises:
   a delay element, wherein the delay element is at least configured to receive a selected sampling clocking signal of the two synchronous input clocking signals and is at least configured to generate a time delayed version of the selected sampling clocking signal; and
   a sampling latch, wherein the sampling latch is at least configured to receive a non-sampling clocking signal of the two synchronous input clocking signals and is at least configured to generate a syncClk clocking signal, and wherein the sampling latch is at least configured to trigger on an edge of the time delayed version of the selected sampling clocking signal.

4. The apparatus of claim 3, wherein the sampling latch further comprises at least one D flip-flop.

5. The apparatus of claim 4, wherein the D flip-flop is at least configured to: receive a non-sampling clocking signal of the two synchronous input clocking signals and is at least configured to generate a syncClk clocking signal; and trigger on an edge of the time delayed version of the selected sampling clocking signal.

6. The apparatus of claim 1, wherein the plurality of synchronization latches further comprises a plurality of cascaded D flip-flops.

7. The apparatus of claim 6, wherein the plurality of cascaded D flip-flops further comprises:

a first D flip-flop, wherein the first D flip-flop is at least configured to receive the asynchronous divider reset signal, and wherein the first D flip-flop is at least configured to trigger on an edge of the syncClk clocking signal; and a second D flip-flop, wherein the second D flip-flop is at least configured to receive the output of the first D flip-flop and is at least configured to generate the sync signal, and wherein the second D flip-flop is at least configured to trigger on the edge of the syncClk clocking signal that triggers the first D flip-flop.

8. The apparatus of claim 1, wherein the counting circuit further comprises:

a plurality of counting latches, wherein at least one counting latch of the plurality of counting latches is at least configured to receive the sync signal; and an XOR gate, wherein the XOR gate is at least configured to receive an output of at least two counting latches of the plurality of counting latches and is at least configured to output the synchronous divider reset signal.

9. The apparatus of claim 8, wherein the plurality of counting latches further comprises a plurality of D flip-flops.

10. The apparatus of claim 9, wherein the plurality of non-integer frequency ratio clocking signals further comprises two synchronous input clocking signals.

11. The apparatus of claim 10, wherein the plurality of D flip-flops further comprises:

a first D flip-flop, wherein the first D flip-flop is at least configured to receive the sync signal, and wherein the first D flip-flop is at least configured to trigger on an edge of the selected sampling clocking signal of the two synchronous input clocking signals to output a first counting output; and a plurality of additional cascaded D flip-flops, wherein a first cascade D flip-flop of the plurality of cascaded D flip-flops is at least configured to receive the first counting output, and wherein each of the cascade D flip-flops of the plurality of cascaded D flip-flops is at least configured to trigger on an edge of the selected sampling clocking signal of the two synchronous input clocking signals.

12. A method for synchronizing an asynchronous divider reset signal for a plurality of non-integer frequency ratio clocking signals, comprising:

receiving the asynchronous divider reset signal;

producing a syncClk clocking signal from the plurality of non-integer frequency ratio clocking signals;

producing a sync signal from the asynchronous divider reset signal, wherein the sync signal is at least triggered on an edge of the syncClk clocking signal;

generating a plurality of cascaded counting signals from the sync signal, wherein the counting signals are at least triggered on an edge of at least one non-integer frequency ratio clocking signal of the plurality of non-integer frequency ratio clocking signals; and operating on at least two cascaded counting signals of the plurality of counting signals with a logic gate to produce a synchronous divider reset signal.

13. The method of claim 12, wherein the step of producing a syncClk clocking signal further comprises:

delaying at least one non-integer frequency ratio clocking signal of the plurality of non-integer frequency ratio clocking signals to produce a delayed sampling clocking signal;

toggling a sampling latch with at least one non-sampling clocking signal of the plurality of non-integer frequency ratio clocking signals; and triggering the sampling latch with an edge of the delayed sampling clocking signal.

14. The method of claim 13, wherein the step of producing the syncClk clocking signal further comprises receiving two non-integer frequency ratio synchronous clocking signals.

15. The method of claim 12, wherein the step of producing a sync signal further comprises:

toggling a first synchronization latch with the asynchronous divider reset signal to produce a first output;

triggering the first synchronization latch with an edge of the syncClk clocking signal;

toggling a second synchronization latch with the first output to produce the sync signal; and triggering the second synchronization latch with the edge of the syncClk clocking signal that triggers the first synchronization latch.

16. The method of claim 12, wherein the step of generating a plurality of cascaded counting signals further comprises:

toggling a first counting latch with the sync signal to produce a first counting output;

propagating the first counting output with an edge of a sampling clocking signal of the plurality of non-integer frequency ratio clocking signals to produce a first cascade signal;

serially toggling a plurality of serially coupled latches to produce a plurality of cascaded counting signals; and triggering each of the cascaded counting signals of the plurality of cascaded counting signals with an edge of a sampling clocking signal of the plurality of non-integer frequency ratio clocking signals.

17. The method of claim 12, wherein the step of operating further comprises XORing two cascaded counting signals to produce the synchronous divider reset signal.

18. A computer program product for synchronizing an asynchronous divider reset signal for a plurality of non-integer frequency ratio clocks, with the computer program product having a medium with a computer program embodied thereon, wherein the computer program comprises:

computer code for receiving the asynchronous divider reset signal;

computer code for producing a syncClk clocking signal from the plurality of non-integer frequency ratio clocking signals;

computer code for producing a sync signal from the asynchronous divider reset signal, wherein the sync signal is at least triggered on an edge of the syncClk clocking signal;

computer code for generating a plurality of cascaded counting signals from the sync signal, wherein the counting signals are at least triggered on an edge of at least one non-integer frequency ratio clock of the plurality of non-integer frequency ratio clocking signals; and computer code for operating on at least two cascaded counting signals of the plurality of counting signals with a logic gate to produce a synchronous divider reset signal.

19. The computer program product of claim 18, wherein the computer code for producing a syncClk clocking signal further comprises:
   computer code for delaying at least one non-integer frequency ratio clocking signal of the plurality of non-integer frequency ratio clocking signals to produce a delayed sampling clocking signal;
   computer code for toggling a sampling latch with at least one non-sampling clocking signal of the plurality of non-integer frequency ratio clocking signals; and
   computer code for triggering the sampling latch with an edge of the delayed sampling clocking signal.

20. The computer program product of claim 19, wherein the computer code for producing the syncClk clocking signal further comprises receiving two non-integer frequency ratio synchronous clocking signals.

21. The computer program product of claim 18, wherein the computer code for producing a sync signal further comprises:
   computer code for toggling a first synchronization latch with the asynchronous divider reset signal to produce a first output; computer code for triggering the first synchronization latch with an edge of the syncClk clocking signal;
   computer code for toggling a second synchronization latch with the first output to produce the sync signal; and
   computer code for triggering the second synchronization latch with the edge of the syncClk clocking signal that triggers the first synchronization latch.

22. The computer program product of claim 18, wherein the computer code for generating a plurality of cascaded counting signals further comprises:
   computer code for toggling a first counting latch with the sync signal to produce a first counting output;
   computer code for propagating the first counting output with an edge of a sampling clocking signal of the plurality of non-integer frequency ratio clocking signals to produce a first cascade signal;
   computer code for serially toggling a plurality of serially coupled latches to produce a plurality of cascaded counting signals; and
   computer code for triggering each of the cascaded counting signals of the plurality of cascaded counting signals with an edge of a sampling clocking signal of the plurality of non-integer frequency ratio clocking signals.

23. The computer program product of claim 18, wherein the computer code for operating further comprises XORing two cascaded counting signals to produce the synchronous divider reset signal.

24. An apparatus for ensuring synchronization of clocks in a multiple clock processor system having a plurality of downstream divider stream trees, comprising:
   first logic means for indicating misalignment of first and second clocks;
   reset means, connected to said first logic means, for providing a synchronous divider reset signal for resetting each of said downstream divider trees;
   second logic means, connected to first logic means and said reset means, for receiving said first logic means indication and for determining a proper clock cycle at which to issue a signal to the reset means, wherein the reset means is configured for providing the synchronous divider reset signal in response to the received signal from the second logic means; and
   wherein the second logic further comprises a counting circuit, comprising:
      a plurality of counting latches, wherein at least one counting latch of the plurality of counting latches is at least configured to receive a signal from the reset means; and
      an XOR gate, wherein the XOR gate is at least configured to receive an output of at least two counting latches of the plurality of counting latches and is at least configured to output the synchronous divider reset signal.

25. An apparatus for ensuring synchronization of clocks in a multiple clock processor system having a plurality of downstream divider stream trees, comprising:
   first logic means for indicating misalignment of first and second clocks;
   reset means, connected to said first logic means, for providing a synchronous divider reset signal for resetting each of said downstream divider trees;
   second logic means, connected to first logic means and said reset means, for receiving said first logic means indication and for determining a proper clock cycle at which to issue a signal to the reset means, wherein the reset means is configured for providing the synchronous divider reset signal in response to the received signal from the second logic means; and wherein the first logic means further comprises:
   a delay element, wherein the delay element is at least configured to receive at least one of the clocking signals selected from the group consisting of said first and second clocks and is at least configured to generate a time delayed version of the selected sampling clocking signal; and
   a sampling latch, wherein the sampling latch is at least configured to receive an output of the delay element.

26. The apparatus of claim 25, wherein the reset means further comprises a plurality of synchronization latches, wherein at least one latch of the plurality of synchronization latches is at least configured to receive an asynchronous divider reset signal, and wherein at least one synchronization latch of the plurality of synchronization latches is at least configured to produce a sync signal.

27. The apparatus of claim 26, wherein the plurality of latches further comprises a plurality of cascaded D flip-flops.

28. The apparatus of claim 25, wherein the second logic further comprises a counting circuit.

* * * * *